United States Patent [19]
Jurjans

[11] 3,804,297
[45] Apr. 16, 1974

[54] LIQUID CHEMICAL MIXING AND DELIVERY SYSTEM

[75] Inventor: Ojars Jurjans, Camden, N.J.

[73] Assignee: Jetronic Industries, Inc., Philadelphia, Pa.

[22] Filed: June 8, 1973

[21] Appl. No.: 368,312

[52] U.S. Cl............... 222/54, 222/56, 222/64, 68/12 R, 68/17 R
[51] Int. Cl............................................. B67d 5/08
[58] Field of Search............ 222/52, 54, 56, 64, 65; 68/12 R, 17 R

[56] References Cited
UNITED STATES PATENTS
2,879,143  3/1959  Thurman.......................... 68/17 R X
2,993,624  7/1961  Crist et al. ............................ 222/54
3,664,549  5/1972  Maselli................................. 222/64

Primary Examiner—Stanley H. Tollberg
Assistant Examiner—Joseph J. Rolla
Attorney, Agent, or Firm—Paris, Haskell & Levine

[57] ABSTRACT

A system for automatic and semi-automatic mixing of chemical solutions and the delivery thereof to a utilization system. A solution vehicle, such as water, and liquid chemical additives are delivered to a solution preparation tank. Sensors in the tank determine when the tank is empty and full, and the temperature of the contents. This information is used to operate an automatic tank control system which controls the delivery of ingredients and of heat to the tank, and the emptying of the tank contents. Alternatively, the emptying function may be controlled manually. By the use of a plurality of solution preparation tanks and respective control systems, together with a sequencing control system, continuous output flow of mixed solution may be obtained.

10 Claims, 4 Drawing Figures

3,804,297

LIQUID CHEMICAL MIXING AND DELIVERY SYSTEM

SUMMARY OF INVENTION

The present invention relates to industrial liquid chemical mixing and delivery systems, and to both semi-and fully automatic systems therefor. One primary field of utility for the present invention is that of industrial textile washing operations, and therefore the present invention is described herein with reference to that area of use. However, it is apparent that the invention is not limited thereto, and is adaptable to a broad range of liquid mixing and delivery applications.

Industrial textile wash operations typically require a relatively constant flow of pre-mixed and pre-heated chemical solutions to be delivered to the wash range. Various additives that are introduced include, for example, liquid detergents and caustic solutions. These additives may be manually measured and placed in a special water filled supply tank and then steam heated up to the desired temperature. After the proper temperature is reached, the solution may be dumped into the wash range by manually operating a dump valve. To assure uninterrupted operation of the wash range, two or more of such solution preparation tanks may be needed In the wash range, the web of fabric of indefinite length is guided and transported by rollers with essentially constant speed, and at selected intervals the fabric web is run through the chemical solution baths. For the fabric to be fed in the range without interruptions, it is important that the required chemical solutions be available at all times. Furthermore, it is important that the amount and type of chemicals, as well as the temperature of the solution, be conveniently adjustable to meet the specific requirements of different types of fabrics processed in the wash range.

In accordance with the present invention, a solution preparation tank is provided which is fed by water and a plurality of liquid reagent or liquid additive reservoirs. In addition, the preparation tank is provided with means for heating its contents, which may, for example, be a steam injector. The reagent or additive feed is preferably controlled by a measuring pump for each additive.

The preparation tank is provided with three sensors: a full sensor for detecting when the tank is filled to a selected level, an empty sensor for detecting when the contents have been withdrawn to a selected level, and a temperature sensor for measuring the temperature of the tank contents. A control system is provided which responds to signals obtained from these sensors for filling the tank with water, adding predetermined quantities of reagents during the fill operation, and holding the full tank charge until the temperature of the contents has reached a predetermined value, and then dumping the tank contents into the wash range. Initiation of the fill and dumping operations may be manually controlled from a control console, in which event, interlocks are provided so that the fill operation cannot be initiated unless the tank is empty, and so that the dumping operation cannot be initiated until the tank is full and its contents are at the predetermined temperature. Alternatively, the present invention provides for a completely automatic control, wherein the filling of the preparation tank and its dumping are effected by a control system. An automatic control system is desirable particularly in conjunction with fabric processing systems utilizing a continuous or continual introduction of reagents or additives. Accordingly, such systems would normally require a plurality of preparation tanks, so that while one or more tanks are being filled and brought up to temperature, another is being dumped into the wash range.

It is therefore one object of the present invention to provide for the automatic preparation of a charge of reagents for introduction into a processing line or other utilization system.

Another object of the present invention is to provide for preparation of said charge by providing a predetermined quantity of vehicle, such as water, providing predetermined quantities of additives or reagents in said vehicle, and providing for heating said charge to a predtermined temperature.

Another object of the present invention is to provide for semi-automatic and fully automatic control of the charge preparation and dumping process.

Other objects and advantages of the present invention will become apparent to those skilled in the art from a consideration of the following illustrative specific example of the invention, had in conjunction with the accompaying drawings.

BRIEF DESCRIPTION OF DRAWINGS

In the accompanying drawings, like reference characters refer to like or corresponding parts; and.

DETAILED DESCRIPTION

Figure 1:
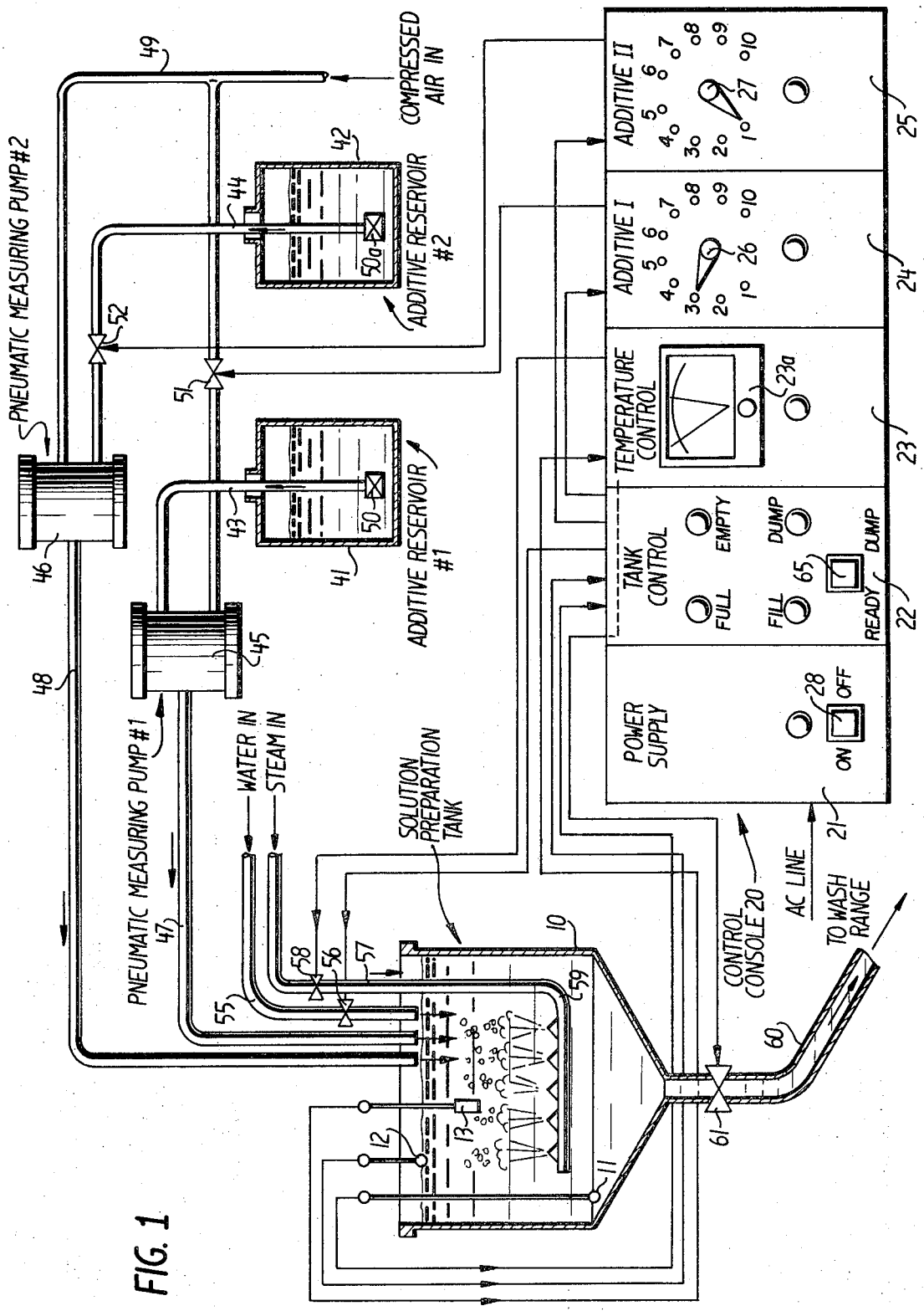
FIG. 1 is a schematic illustration of a system embodying the present invention for semi-automatic control of the preparation and dumping of a reagent charge.

The semi-automatic system for the preparation of a reagent charge in accordance with the present invention, shown in FIG. 1, comprises a solution preparation tank 10 having a lower level or empty sensor 11 located adjacent the bottom of the tank, an upper level or full sensor 12 located adjacent the top of the tank, and a temperature sensor 13 located in a central portion of the tank. These three sensors are electrically connected to control console 20, which comprises a power supply module 21, a tank control module 22, a temperature control module 23, and a plurality of additive control modules shown for illustrative purposes as two, 24 and 25.

The system also includes a plurality of additive reservoirs, of which two are shown for illustrative purposes, 41 and 42. Each reservoir contains a separate liquid additive or reagent, such as detergent and caustic solution in the case of a commercial textile washing operation. Feed lines 43 and 44 connect the reservoirs 41 and 42 through check valves 50 and 50a to the imputs of respective pneumatic measuring pumps 45 and 46, and the outputs of the pumps deliver the additives to the preparation tank 10 via lines 47 and 48. A compressed air source is coupled to each of the pneumatic pumps via line 49 and through respective air solenoid valves 51 and 52. Thus, when the solenoid valves 51 and 52 are cycled open and closed, the respective pneumatic pumps 45 and 46 are caused to cycle therewith, pumping reagent from the respective reservoirs 41 and 42 to the preparation tank 10. The cycling of solenoid valves 51 and 52 is effected by the additive control modules 24 and 25, preferably utilizing digital pulsing systems, which are triggered into an operation cycle by a signal from the tank control module 22, as will be described subsequently. The number of valve operating pulses generated by each additive control module is settable by respective manual selectors 26 and 27. Thus, each time the additive control modules are triggered, the respective pumps are operated for a selected number of strokes, thereby delivering selected quantities of reagents from the reservoirs 41 and 42 to the preparation tank 10. The nature of the additive control modules and their digital circuitry and their resultant control of reagent feed is fully described in U.S. Pat. No. 3,721,908, issued Mar. 20, 1973, and pending U.S. patent application Ser. No. 275,043, filed July 25, 1972, both in the name of the present inventor.

Preparation tank 10 is provided with two additional input lines, a water line 55 having solenoid valve 56 therein, and a steam line 57 having solenoid valve 58 therein and terminating in a set of nozzles 59 adjacent the bottom of the tank. The drain or output line from the preparation tank is designated by numeral 60, and it includes a solenoid valve 61.

Electrical signals derived from the full and empty sensors 12 and 11 constitute the inputs to tank control module 22, while the electrical output of temperature sensor 13 is the input for temperature control module 23. In response to these inputs, the output of the tank control module operates water input solenoid 56 and triggers the additive control modules 24 and 25, for filling tank 10 and injecting the selected quantities of reagents from reservoirs 41 and 42. The temperature control module 23 operates the steam solenoid 58 to bring the charge in tank 10 to a selected temperature, as determined by the settting of meter 23a. When tank 10 is full, the reagents have been added, and the temperature of the charge is correct, the charge may be dumped under the combined control of the tank and temperature control modules 22 and 23.

Figure 2:
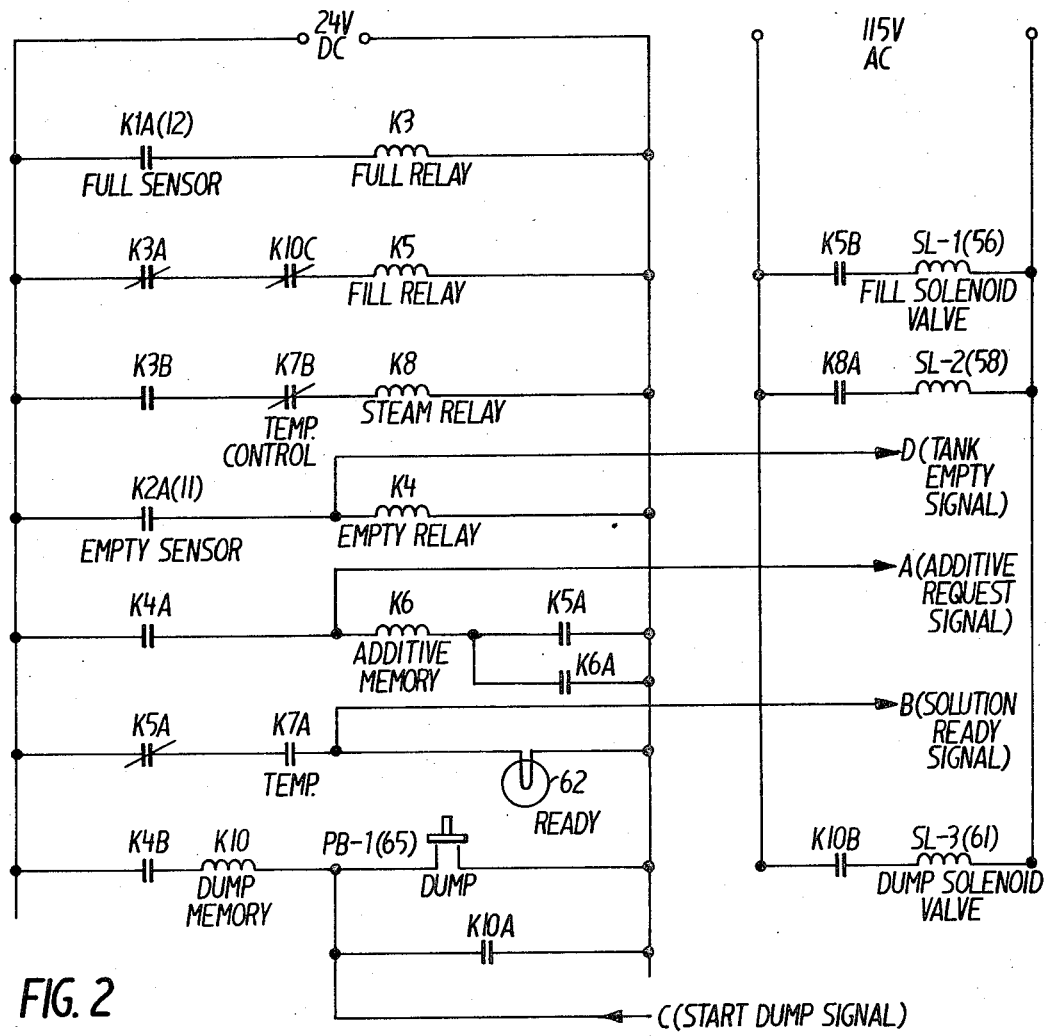
FIG. 2 is a simplified electrical diagram illustrating a control circuit for the system of FIG. 1.

The electrical circuit for controlling these operations is illustrated in FIG. 2. The power supply module 21 applies the full line voltage across the three tank control solenoids SL-1, Sl-2, and SL-3, which are the fill, steam and dump solenoids 56, 58 and 61, respectively, in FIG. 1. The power supply also applies a d.c. operating voltage across a set of control relays K3, K5, K4 K8, K6, and K10. Associated with these relays are a plurality of switches, including the tank sensor switches K1A and K2A which correspond to the full and empty sensors 12 and 11 in FIG. 1, and the temperature control switches K7A and K7B embodied in temperature control module 23 operated by meter 23a and sensor 13.

Assuming the solution preparation tank to be empty and electric power turned off, all solenoid valves are biased closed, all relays are deenergized, and the entire system is at a standstill. Relay switches K3A, K10C, K7B, and K5A are all in a closed rest position, and all the other switches are in an open rest position, as shown in FIG. 2. When power is turned on by switch 28 in FIG. 1, the fill relay K5 is immediately energized to actuate the fill solenoid valve SL-1 by closing the contacts of switch K5B. The tank begins to fill, and as soon as the liquid level reaches the empty sensor its switch K2A closes and relay K4 is energized. Relay K6 is thereby energized by closure of switch K4A, switch K5A having been previously closed by relay K5. Relay K6 provides the pulse at output A that initiates operation of the additive control modules 24 and 25 and delivery of the reagents to tank 10. In addition, switch K6A locks on relay K6 so that reagent delivery can be initiated only once for every complete fill cycle of the tank 10.

After the reagents or additives are delivered and the tank 10 is full, the full sensor contacts K1A close to energize the full relay K3. This action opens contacts K3A to interrupt the energization of fill relay K5, which in turn deenergizes the fill solenoid valve SL-1 to stop the flow of water. Relay K3 contacts K3B are now closed, energizing the steam relay K8 through the temperature control unit relay contacts K7B. If the selected or desired temperature is above that of the charge in tank 10 as detected by the temperature sensor 13, the K7B contacts are closed, otherwise they are open. Energizing of relay K8 closes contacts K8A to actuate steam solenoid valve SL-2, and steam is injected into the charge in tank 10 through the nozzles 59 until the desired selected charge temperature is reached.

When the selected temperature is attained, temperature control contacts K7B are opened and the steam relay K8 and the steam solenoid valve SL-2 are deenergized. Temperature sensor contacts K7A are closed, and contacts K5A are closed with the deenergizing of fill relay K5. Therefore "Ready" light 62 comes on, and a "Ready" signal is obtained at output B.

If the prepared solution is held in the tank for a prolonged time, the temperature of the solution may go below the selected value. Since the tank is full, full sensor K1A remains closed to energize relay K3, thereby holding contacts K3B closed. The operation of the temperature control unit K7B and relay K8 will therefore again energize steam solenoid valve SL-2 to raise the temperature of the charge to the desired selected value, and then become deenergized by opening of temperature control contacts K7B when the selected temperature is again attained.

When the operator desires to deliver the heated solution charge in tank 10 to the wash range, since relay contacts K4B are closed, the push button switch PB-1 is momentarily depressed to energize relay K10, and it is latched in energized state through contacts K10A. The dump solenoid valve SL-3 is thus actuated by closure of relay contacts K10B.

After the relay K10 is energized, the actuation of dump solenoid valve SL-3 continues until the empty relay K4 is deenergized by the opening of empty sensor switch K2A when the tank empties. Solenoid valve SL-3 is then deenergized and the system starts a new fill cycle as described hereinabove. Starting of a new fill cycle is occassioned by the closure of contacts K10C, which were opened during the dump phase of the cycle. Of course, once dumping of the tank charge had begun, relay contacts K3A were also closed. With switches K3A and K10C closed, fill relay K5 is energized to actuate solenoid SL-1, as previously described.

The control system as above-described is semi-automatic, in that the decision to dump the contents of a full solution preparation tank that is up to prescribed temperature, is effected manually by operation of push button switch 65 in FIG. 1, or PB-1 in FIG. 2. It is apparent that the dump action may be automated also. For this purpose the output B designated in FIG. 2 may operate a relay that closes a relay switch in parallel with manual switch PB-1, which is represented as an input C in FIG. 2, as will be described subsequently.

Figure 3:
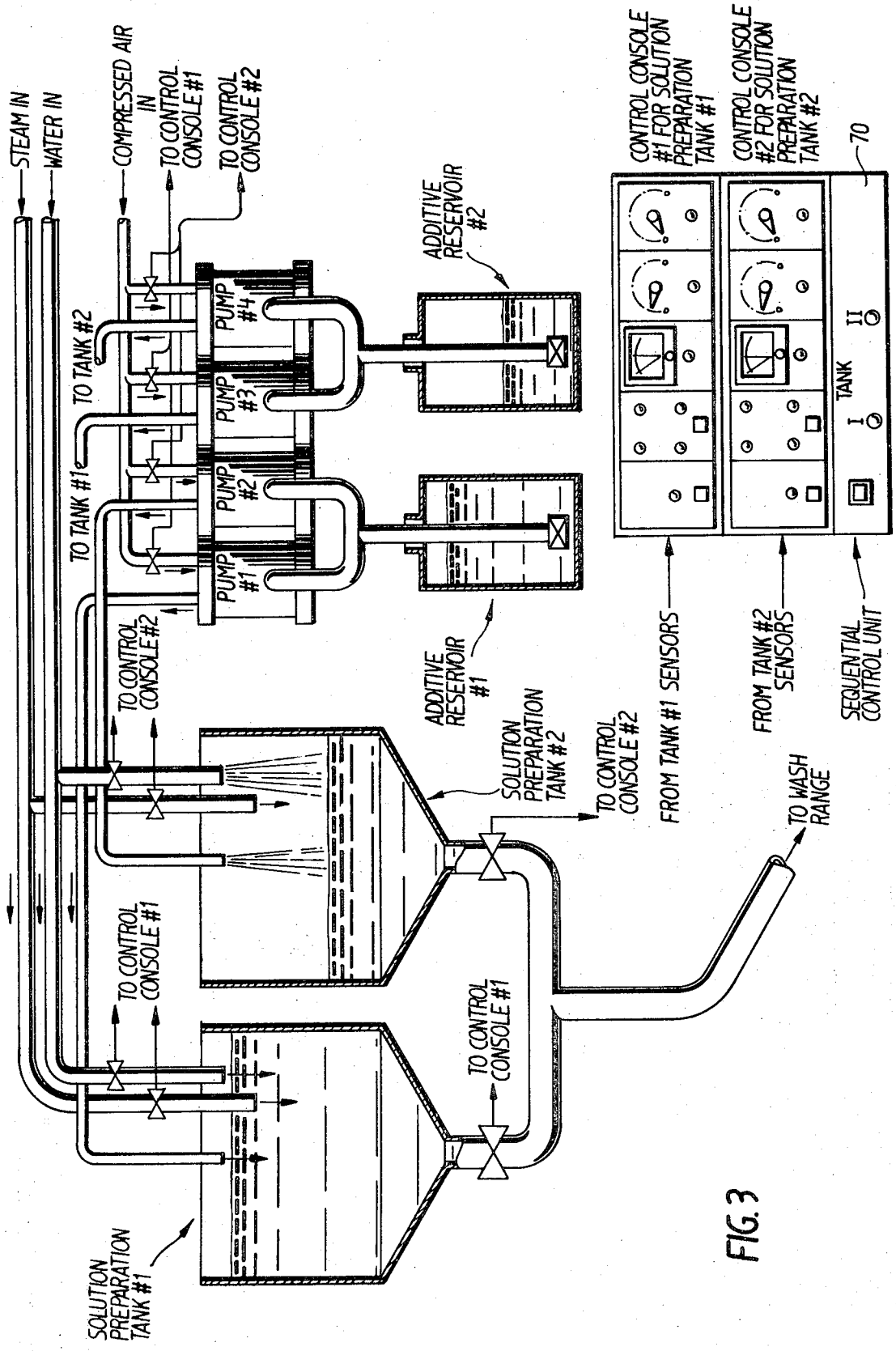
FIG. 3 is a schematic illustration of a system embodying the present invention for fully automatic control of the preparation of a reagent charge, and the continual feed thereof to the line of a utilization system.

Automatic dumping of the contents of tank 10 into a utilization system would be practical primarily (although not necessarily) in conjunction with a utilization system that requires continuous feed of the chemical mixture being formulated in the tank 10. Obviously, a single tank and control system cannot provide this continous feed, because of the time interval required after each dumping action is completed to fill the tank and bring its new contents up to desired temperature. For this purpose, a plurality of tanks 10, are required, so that one tank is always ready to be dumped following the emptying of another tank. Such a system embodying two solution preparation tanks is illustrated in FIG. 3, wherein one tank is being dumped while the other is being filled and brought up to temperature. From the legends on the drawing of FIG. 3, the foregoing detailed description of a one tank system, and the following brief general description of the FIG. 3 embodiment, the operation of a multitank system will be apparent.

In FIG. 3, each solution preparation tank is associated in the same way as FIG. 1 with a respective control console, with respective feed lines from the additive reservoirs, the steam source and the water supply, and drain lines to a wash range or other utilization system. The full tank, empty tank, and temperature sensors of each tank are coupled to the respective control console, and the consoles in turn control the solenoid valves for the additive pumps, the water inputs, the steam inputs, and the tank drains for the respective tank systems. Thus, in the manner as previously explained, each tank fills with water, receives a measured charge of additives, is heated to a selected temperature, and then has its contents dumped to the wash range, or other utilization system.

Figure 4:
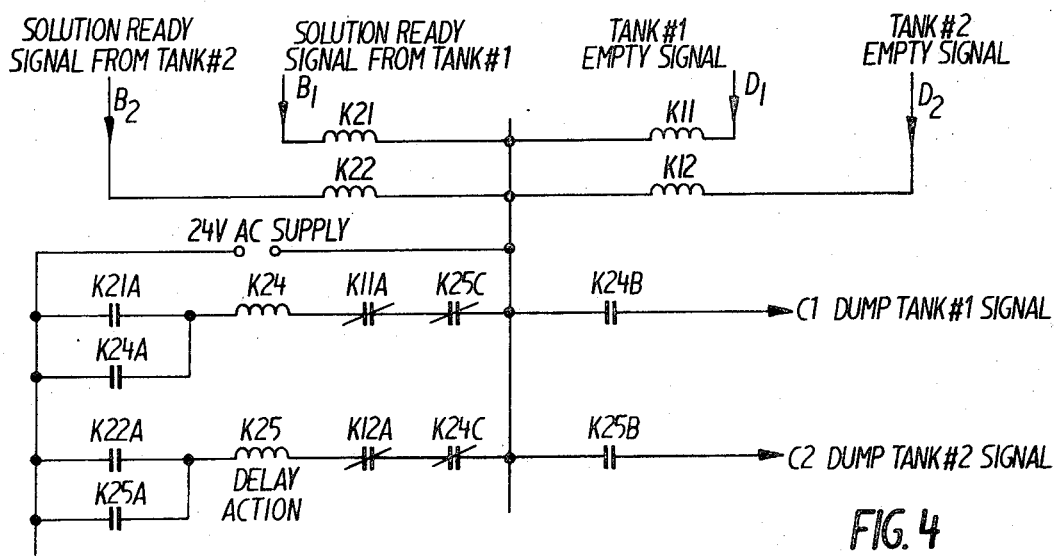
FIG. 4 is a simplified electrical diagram illustrating a control circuit for the system of FIG. 3.

In addition to the cycling controls as outlined above for each solution preparation tank, the present multiple tank system requires a sequential control unit 70, to properly sequence the two control consoles, so that a second of the tanks can not begin to dump its charge until the preceding tank has emptied. A simplified sequential control circuit 70 is shown in FIG. 4. The condition of the circuit as shown is at rest, where neither tank is ready to be dumped and neither tank is empty. Under these circumstances none of the relays K21, K22, K24, K25, K11 and K12 are energized, and all relay switches are open, except K11A, K12A, K24C and K25C which are closed.

Assuming that thank No. 1 is ready to be dumped, the ready signal from the respective tank control unit No. 1 (see output B in FIG. 2) energizes relay k21 which closes switch K21A. Relay K24 is then energized closing latching switch K24A and dump switch K24B. The latter action provides input C in FIG. 2 to energize tank No. 1 dump solenoid. If during the period that tank No. 1 is draining, tank No. 2 fills and becomes ready, no dump signal will be provided for tank No. 2, because contacts K24C are open while relay K24 is energized, thereby locking out relay K25 which must be energized to initiate a dump signal for tank No. 2. As soon as the solution tank No. 1 is empty, tank No. 1 empty signal from output D in FIG. 2 energizes relay K11 to unlatch and deenergize relay K24 by opening contacts K11A, and the dump tank No. 1 signal ceases.

Since tank No. 2 is now full and up to temperature and tank No. 1 is empty, switches K12A and K24C are closed, the tank No. 2 ready input signal from B (FIG. 2) energizes relay K22, and by closure of switch K22A energizes relay K25 which latches through closure of its contacts K25A. Switch K25B is also closed to provide a dump signal at C (FIG. 2) and thereby dump tank No. 2. This action continues until tank No. 2 is empty, when the empty signal D (FIG. 2) energizes relay R12 to open switch K12A and unlatch relay K25. During the time that tank No. 2 is draining, tank No. 1 is prevented from dumping by the fact that switch K25C is open, locking out relay K24. Should it happen that both tanks No. 1 and No. 2 become ready for dumping at the same time, relay K25 is designed for a delayed action, thereby providing programmed precedence to relay K24. Thus it can be seen that the solution tanks No. 1 and No. 2 will be prepared and dumped in sequence, providing uninterrupted constant flow of chemical solution to the wash range or other utilization system.

The foregoing detailed description of the invention is presented for illustrative purposes only, to facilitate the understanding and practice of the invention. Obviously, numerous variations and modifications will become apparent to those skilled in the art. For example, the control circuits are shown as electro-mechanical relay and switch systems, but certainly the system could be fully electronic if desired. The continuous flow feed system was illustrated as a two tank system. Obviously more than two tanks could be used. Accordingly, such variations and modifications as are embraced by the spirit and scope of the following claims are contemplated as within the purview of the invention.

What is claimed is:

1. A liquid mixing and delivery system comprising a solution preparation tank, means for feeding a liquid vehilce to said tank, means for feeding a predetermined quantity of liquid additive to said tank, heating means for said tank, means for withdrawing solution from said tank, an empty sensor for sensing when the tank is substantially empty of solution, a full sensor for sensing when the tank is substantially full with solution, a temperature sensor for sensing the temperature of solution in said tank, first control means for said vehicle feeding means, second control means for said additive feeding means, third control means for said heating means, fourth control means for said solution withdrawing means, means responsive to said empty sensor for operating said first and second control means to initiate liquid vehicle and liquid additive feed to said tank when said tank is substantially empty, means responsive to said full sensor for operating said first control means to terminate vehicle feed to said tank when said tank is substantially full, means responsive to said temperature sensor for operating said third control means to heat the solution in said tank to a predetermined temperature, dumping means for operating said fourth control means, means interlocking said dumping means with said full sensor responsive means and said temperature sensor responsive means for disabling said dumping means when said tank is not substantially full or its contents is below said predetermined temperature.

2. A liquid mixing and delivery system as set forth in claim 1, wherein said first and fourth control means are solenoid valves.

3. A liquid mixing and delivery system as set forth in claim 1, wherein said means responsive to said empty sensor and said full sensor are relays.

4. A liquid mixing and delivery system as set forth in claim 3, wherein said dumping means comprises a switch.

5. A liquid mixing and delivery system as set forth in claim 4, wherein said switch is relay operated in response to said full sensor and temperature sensor.

6. A liquid mixing and delivery system as set forth in claim 3, wherein said first and fourth control means are solenoid valves.

7. A liquid mixing and delivery system comprising a plurality of solution preparation tanks; for each tank there being means for feeding a liquid vehicle to the tank, means for feeding a predetermined quantity of liquid additive to the tank, heating means fo the tank, means for withdrawing solution from the tank, an empty sensor for sensing when the tank is substantially empty of solution, a full sensor for sensing when the tank is substantially full with solution, a temperature sensor for sensing the temperature of solution in the tank, first control means for said vehicle feeding means, second control means for said additive feeding means, third control means for said heating means, fourth control means for said solution withdrawing means, means responsive to said empty sensor for operating said first and second control means to initiate liquid vehicle and liquid additive feed to the tank when the tank is substantially empty, means responsive to said full sensor for operating said first control means to terminate vehicle feed to the tank when the tank is substantially full, means responsive to said temperature sensor for operating said third control means to heat the solution in the tank to a predetermined temperature, dumping means for operating said fourth control means, means interlocking said dumping means with said full sensor responsive means and said temperature sensor responsive means for disabling said dumping means when the tank is not substantially full or its contents are below said predetermined temperature; means interlocking said dumping means of each tank with the dumping means of all other tanks to disable the dumping of said other tanks on operation of the dumping means of one tank until said one tank is substantially empty.

8. A liquid mixing and delivery system as set forth in claim 7, wherein the dumping means for the different tanks include means having different time response characteristics to cause only one dumping means to response should more than one dumping means be actuated simultaneously.

9. A liquid mixing and delivery system as set forth in cliam 7, wherein each dumping means comprises a switch.

10. A liquid mixing and delivery system as set forth in claim 9, wherein for each tank the dumping means switchhas a relay operator responsive to said full sensor and temperature sensor.

* * * * *